United States Patent
Chen et al.

(10) Patent No.: US 11,563,551 B2
(45) Date of Patent: Jan. 24, 2023

(54) UPLINK TRANSMISSION CANCELLATION INSTRUCTION MONITORING METHOD AND TERMINAL

(71) Applicant: VIVO MOBILE COMMUNICATION CO., LTD., Guangdong (CN)

(72) Inventors: Xiaohang Chen, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 151 days.

(21) Appl. No.: 17/035,423

(22) Filed: Sep. 28, 2020

(65) Prior Publication Data
US 2021/0014036 A1    Jan. 14, 2021

Related U.S. Application Data

(63) Continuation of application No. PCT/CN2019/077653, filed on Mar. 11, 2019.

(30) Foreign Application Priority Data

Mar. 28, 2018 (CN) .......................... 201810266522.4

(51) Int. Cl.
   *H04L 5/00* (2006.01)
   *H04W 24/08* (2009.01)
   *H04W 72/04* (2009.01)

(52) U.S. Cl.
   CPC .......... *H04L 5/0098* (2013.01); *H04L 5/0094* (2013.01); *H04W 24/08* (2013.01);
   (Continued)

(58) Field of Classification Search
   None
   See application file for complete search history.

(56) References Cited

U.S. PATENT DOCUMENTS

| 2014/0016499 | A1 | 1/2014 | Forenza et al. |
| 2016/0088521 | A1 | 3/2016 | Ho et al. |
| 2016/0204854 | A1 | 7/2016 | Miller et al. |
| 2019/0254056 | A1* | 8/2019 | Salah ............... H04W 72/0446 |

(Continued)

FOREIGN PATENT DOCUMENTS

| CN | 103546194 A | 1/2014 |
| CN | 103929267 A | 7/2014 |

(Continued)

OTHER PUBLICATIONS

IN Office Action in Application No. 202027044927 dated Sep. 6, 2021.

(Continued)

*Primary Examiner* — Abdelillah Elmejjarmi
(74) *Attorney, Agent, or Firm* — Maschoff Brennan

(57) ABSTRACT

A method of monitoring an uplink transmission cancellation instruction and a terminal are provided. The method of monitoring an uplink transmission cancellation instruction is applied to a terminal and includes: when the terminal switches a BWP, determining, according to first preset configuration information, whether to perform monitoring of uplink transmission cancellation instruction during a BWP switching process; when the monitoring of the uplink transmission cancellation instruction is determined to be performed, monitoring the uplink transmission cancellation instruction during the BWP switching process; when the monitoring of the uplink transmission cancellation instruction is determined not to be performed, not monitoring the uplink transmission cancellation instruction during the BWP switching process.

20 Claims, 3 Drawing Sheets

(52) U.S. Cl.
CPC ..... *H04W 72/042* (2013.01); *H04W 72/0446* (2013.01); *H04W 72/0453* (2013.01)

(56) References Cited

U.S. PATENT DOCUMENTS

| | | | | |
|---|---|---|---|---|
| 2019/0261247 | A1* | 8/2019 | Wang | H04W 72/0493 |
| 2020/0178144 | A1 | 6/2020 | Zhou | |
| 2020/0344747 | A1* | 10/2020 | Park | H04L 5/0094 |
| 2020/0374866 | A1* | 11/2020 | Takeda | H04W 72/042 |

FOREIGN PATENT DOCUMENTS

| | | |
|---|---|---|
| CN | 106717054 A | 5/2017 |
| CN | 107493605 A | 12/2017 |
| CN | 109451792 A | 3/2019 |

OTHER PUBLICATIONS

JP Office Action in Application No. 2020-552217 dated Nov. 17, 2021.
"On Indication of Preempted Resources in UL" 3GPP TSG RAN WG1 NR Ad-Hoc#2, R1-1710733, Samsung, Jun. 27, 2017.
"Remaining details on UL/DL Resource Allocation" 3GPP TSG RAN WG1 Meeting R1-92, R1-1801681, MediaTek Inc., Feb. 26, 2018.
"Remaining issues on bandwidth part operation" 3GP TSG RAN WG1 Meeting #92, R1-1802216, LG Electronics, Feb. 26, 2018.
CN Office Action in Application No. 201810266522.4 dated Jun. 30, 2020.
"PUCCH design in support of LTE-A MIMO feedback" 3GPP TSG-RAN WG1 #62bis, Oct. 11, 2010.
"Clarification on the RACH re-initiation after BWP switching" 3GPP TSG-RAN WG2 Meeting #101, Feb. 26, 2018.
Written Opinion and International Search Report in Application No. PCT/CN2019/077653 dated Oct. 8, 2020.
EP Search Report in Application No. 19775227.2 dated Apr. 26, 2021.
"Remaining issues on multiplexing data with different transmission durations" 3GPP TSG RAN WG1 Meeting 91, vivo, R1-1719798, Nov. 27, 2017.
"Remaining details of multiplexing of different data channel durations" 3GPP TSG RAN WG1 Meeting 91, Intel Corporation, R1-1720099. Nov. 27, 2017.
"Remaining issues on bandwidth part switching" 3GPP TSG RAN WG1 Meeting #92, ETRI, R1-1802144, Feb. 26, 2018.

\* cited by examiner

UPLINK TRANSMISSION CANCELLATION INSTRUCTION MONITORING METHOD AND TERMINAL

CROSS-REFERENCE TO RELATED APPLICATION

This application is a continuation application of a PCT Application No. PCT/CN2019/077653 filed on Mar. 11, 2019, which claims a priority to Chinese Patent Application No. 201810266522.4 filed on Mar. 28, 2018, the disclosures of which are incorporated in their entirety by reference herein.

TECHNICAL FIELD

The present disclosure relates to the field of communications technology, in particular to a method of monitoring an uplink transmission cancellation instruction and a terminal.

BACKGROUND

Compared with legacy communication systems, a future fifth-generation (5G) mobile communication system needs to adapt to more diverse scenarios and business needs. Main scenarios of the new radio (New Radio, NR) include enhanced mobile broadband (eMBB), massive machine type of communication (mMTC), and ultra-reliable and low latency communications (URLLC). These scenarios require a system having high reliability, low latency, large bandwidth, and wide coverage.

In order to meet different service requirements and different application scenarios, a subcarrier spacing of the NR system is no longer a single 15 kHz like that in long term evolution (LTE). The system may support multiple subcarrier spacings, and different subcarrier spacings may be applied to different scenarios. For example, for a high frequency band and a large bandwidth, a relatively larger subcarrier spacing may be configured. In such a case, a large subcarrier spacing corresponds to a short symbol length in a time domain, which may meet requirements of low-latency services.

In NR Rel-15, a maximum channel bandwidth(channel bandwidth) of each carrier is 400 MHz. However, considering capability of a terminal, a maximum bandwidth supported by the terminal may be less than 400 MHz, and the terminal may operate on multiple small bandwidth parts (BWP). Each bandwidth part corresponds to a numerology (Numerology), a bandwidth, and a frequency location. Each terminal may be configured with one or more BWPs, and a base station needs to inform the terminal which BWP to operate on, that is, which BWP is activated. The activated BWP of the terminal may be dynamically switched through downlink control information (DCI).

When downlink (DL) BWP switch or uplink (UL) BWP switch occurs, a behavior of the terminal detecting and receiving an UL cancellation indication (CI) needs to be clarified to solve the problem that the terminal has an ambiguity understanding before and after the DL/UL BWP switch.

SUMMARY

The embodiments of the present disclosure provide a method of monitoring an uplink transmission cancellation instruction and a terminal.

In a first aspect, the embodiments of the present disclosure provide a method of monitoring an uplink transmission cancellation instruction. The method is applied to a terminal, and includes: when the terminal switches a bandwidth part (BWP), determining, according to first preset configuration information, whether to perform monitoring of uplink transmission cancellation instruction during a BWP switching process; when the monitoring of the uplink transmission cancellation instruction is determined to be performed, monitoring the uplink transmission cancellation instruction during the BWP switching process; when the monitoring of the uplink transmission cancellation instruction is determined not to be performed, not monitoring the uplink transmission cancellation instruction during the BWP switching process.

In a second aspect, the embodiments of the present disclosure provide a method of monitoring an uplink transmission cancellation instruction. The method is applied to a terminal, and includes: when the terminal switches a bandwidth part (BWP), not monitoring the uplink transmission cancellation instruction; wherein, the BWP includes at least one of an uplink BWP or a downlink BWP.

In a third aspect, the embodiments of the present disclosure provide a terminal. The terminal includes a first determining module used to determine, according to first preset configuration information, whether to perform monitoring of uplink transmission cancellation instruction during a bandwidth (BWP) switching process when the terminal switches BWP; a first executing module used to monitor the uplink transmission cancellation instruction during the BWP switching process when the monitoring of the uplink transmission cancellation instruction is determined to be performed; a second executing module used to not monitor the uplink transmission cancellation instruction during the BWP switching process when the monitoring of the uplink transmission cancellation instruction is determined not to be performed.

In a fourth aspect, the embodiments of the present disclosure provide a terminal. The terminal includes a storage, a processor, and a computer program stored on the storage and executable by the processor, wherein when the computer program is executed by the processor, the processor implements steps of the method of monitoring the uplink transmission cancellation instruction.

In a fifth aspect, the embodiments of the present disclosure provide a computer readable storage medium, wherein a computer program is stored on the computer readable storage medium, and wherein when the computer program is executed by a processor, the processor implements steps of the method of monitoring the uplink transmission cancellation instruction.

In a sixth aspect, the embodiments of the present disclosure provide a terminal. The terminal includes a fifth executing module used to not monitor an uplink transmission cancellation instruction when the terminal switches a bandwidth part (BWP); wherein, the BWP includes at least one of an uplink BWP or a downlink BWP.

In a seventh aspect, the embodiments of the present disclosure provide a terminal. The terminal includes a storage, a processor, and a computer program stored on the storage and executable by the processor, wherein when the computer program is executed by the processor, the processor implements a step of the method of monitoring the uplink transmission cancellation instruction.

In an eighth aspect, the embodiments of the present disclosure provide a computer readable storage medium, wherein a computer program is stored on the computer readable storage medium, and wherein when the computer program is executed by a processor, the processor implements a step of the method of monitoring the uplink transmission cancellation instruction.

The beneficial effect of the embodiments of the present disclosure is that by clarifying a behavior of the terminal monitoring the uplink transmission cancellation instruction when the terminal switches a BWP, it is ensured that the terminal may accurately obtain the uplink transmission cancellation instruction before and after the switching is performed, and reliability of communication is ensured.

BRIEF DESCRIPTION OF THE DRAWINGS

In order to more clearly illustrate technical solutions in the embodiments of the present application or related art, following will briefly introduce drawings that need to be used in description of the embodiments or the related art. Obviously, the drawings in the following description are merely some of the embodiments described in the application. For those of ordinary skill in the art, other drawings may be obtained based on these drawings without creative labor.

DETAILED DESCRIPTION

Figure 1:
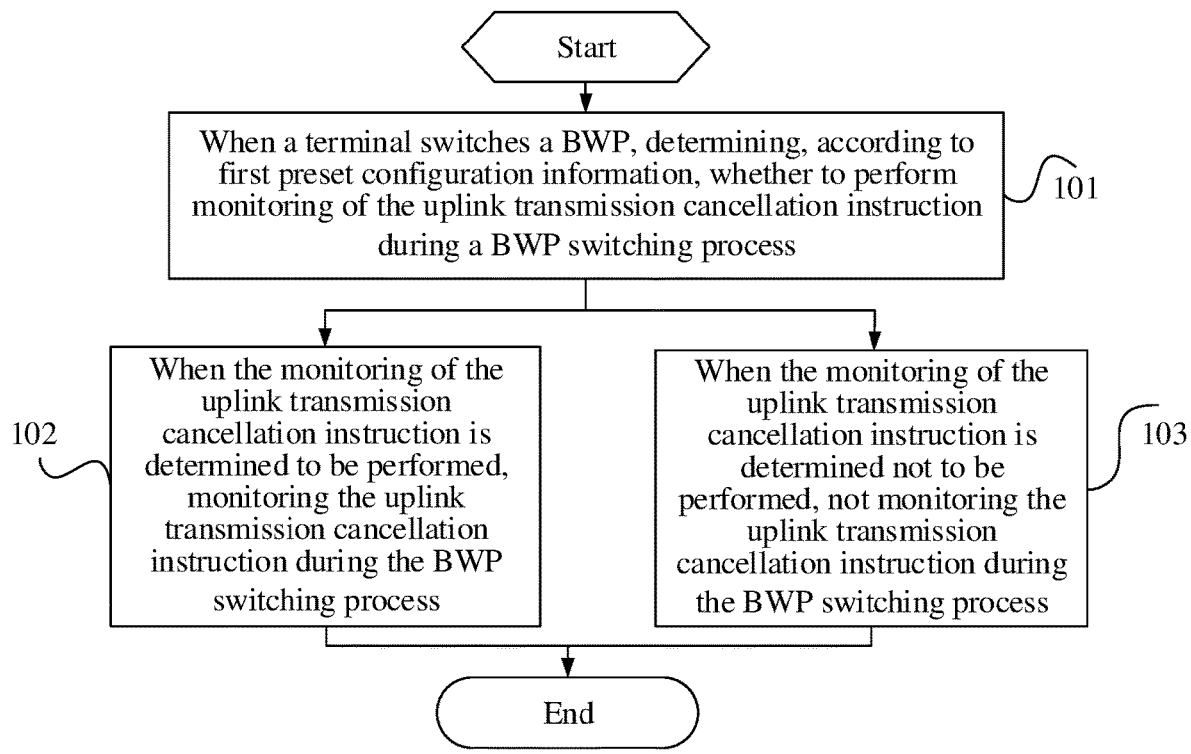
FIG. 1 shows a first schematic flowchart of a method of monitoring an uplink transmission cancellation instruction according to an embodiment of the present disclosure.

The technical solutions in the embodiments of the present disclosure will be described clearly and completely with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative work shall fall within the protection scope of the present disclosure.

The terms "first", "second", etc. in the specification and claims of the present application are used to distinguish similar objects, and are not necessarily used to describe a specific sequence or order. It should be understood that data used in this way may be interchanged under appropriate circumstances so that the embodiments of the present application described herein, for example, may be implemented in a sequence other than those illustrated or described herein. In addition, the terms "including" and "having" and any variations thereof are intended to cover non-exclusive inclusions. For example, a process, a method, a system, a product or a device that includes a series of steps or units is not necessarily limited to the clearly listed steps or units, and may include other steps or units that are not clearly listed or are inherent to these processes, methods, products, or devices. In addition, usage of "and/or" in the specification and claims means at least one of the connected objects, such as A and/or B, which means that only A is included, only B is included, and both A and B are included.

In the embodiments of the present disclosure, words such as "exemplary" or "for example" are used as examples, illustrations, or explanations. Any embodiment or design solution described as "exemplary" or "for example" in the embodiments of the present disclosure should not be construed as being more preferable or advantageous than other embodiments or design solutions. To be precise, words such as "exemplary" or "for example" are used to present related concepts in a specific manner.

The following describes embodiments of the present disclosure in conjunction with the drawings. The method of monitoring an uplink transmission cancellation instruction and the terminal provided by the embodiments of the present disclosure may be applied to wireless communication systems. The wireless communication systems may be systems adopting a fifth generation (5G) mobile communication technology (hereinafter referred to as 5G systems). Those skilled in the art may understand that the 5G NR systems are only examples and are not limitations.

In description of the embodiments of the present disclosure, some concepts used in the following description are explained first.

When an eMBB service and a URLLC service need to be multiplexed, there are two ways. One way is semi-static resource allocation. Transmission of an eMBB service and transmission of a URLLC service are in different resource pools. In this case, it is equivalent to reserving a part of time-frequency resources for the URLLC service. Due to discreteness and uncertainty of a URLLC service, reserved resources will reduce resource utilization. The other method is dynamic multiplexing. The transmission of an eMBB service and the transmission of a URLLC service share the same resource pool, and the base station dynamically schedules eMBB transmission and URLLC transmission for performing multiplexing. Due to latency requirement of the URLLC transmission, the base station may need to schedule the URLLC transmission to resources having been allocated for the eMBB transmission. For dynamic multiplexing of the eMBB transmission and the URLLC transmission, since reliability of the URLLC transmission must be ensured, it is necessary to reduce impact and interference of the eMBB transmission on the URLLC transmission. It is a possible method for a network to send a signaling to eMBB users to suspend or cancel the transmission of eMBB services.

The signaling of cancelling the transmission needs to be notified to the user before the eMBB transmission starts. This is because a user equipment (UE, also called terminal) needs time to process the signaling of cancelling the transmission, and to suspend and interrupt ongoing uplink data transmission.

An eMBB terminal and a URLLC terminal are dynamically multiplexed in the same resource pool. When transmission of the eMBB terminal and transmission of the URLLC terminal overlap (overlapping) in the time/frequency domain, the network will send an uplink transmission cancellation instruction to the eMBB terminal, to notify the eMBB terminal of cancellation of eMBB data transmission. The eMBB terminal may switch a DL/UL BWP during a scheduling process. The embodiments of the present disclosure provide a behavior of the eMBB terminal to detect and understand the uplink transmission cancellation instruction during a DL BWP switching progress or a UL BWP switching process.

Specifically, as shown in FIG. 1, FIG. 1 is a schematic flowchart of a method of monitoring an uplink transmission cancellation instruction according to an embodiment of the present disclosure. The method of monitoring an uplink transmission cancellation instruction is applied to a terminal and includes steps 101-103.

Step 101: when the terminal switches a bandwidth part (BWP), determining, according to first preset configuration information, whether to perform monitoring of the uplink transmission cancellation instruction during a BWP switching process.

It should be noted that the first preset configuration information includes at least one of: first configuration information of the uplink transmission cancellation instruction configured by a downlink BWP or second configuration information of the uplink transmission cancellation instruction configured by an uplink BWP; wherein the first configuration information may include monitoring configuration of the uplink transmission cancellation instruction, such as a monitoring period and a monitoring position of the uplink transmission cancellation instruction; the second configuration information may include an indication pattern of time-frequency resources of a transmission cancelled by the uplink transmission cancellation instruction, such as a size and a granularity of time-frequency resources.

The first preset configuration information may be configured by a network device for the terminal and sent to the terminal, or may be implicitly obtained by other high-layer radio resource control (RRC) signaling, or may be agreed through a protocol. The terminal may directly obtain the first preset configuration information.

It should also be noted that the BWP mentioned in the embodiment of the present disclosure includes at least one of an uplink BWP or a downlink BWP, that is, when the terminal switches a BWP, only the uplink BWP may be switched, or only the downlink BWP may be switched, or the uplink BWP and downlink BWP may be switched simultaneously.

Step 102: when the monitoring of the uplink transmission cancellation instruction is determined to be performed, monitoring the uplink transmission cancellation instruction during the BWP switching process.

It should be noted that the monitoring during the switching process is performed on the downlink BWP before the switching is performed.

Step 103: when the monitoring of the uplink transmission cancellation instruction is determined not to be performed, not monitoring the uplink transmission cancellation instruction during the BWP switching process.

It should be noted that after the terminal determines, according to the first preset configuration information, whether to perform monitoring of the uplink transmission cancellation instruction, the terminal may monitor the uplink transmission cancellation instruction according to an indication from the first preset configuration information, or not monitor the uplink transmission cancellation instruction. In this way, the behavior of the terminal for monitoring the uplink transmission cancellation instruction is clarified, it is ensured that the terminal may accurately obtain the uplink transmission cancellation instruction before and after the switching is performed, and reliability of communication is ensured.

It should be noted that the terminal in the embodiment of the present disclosure is a terminal performing the eMBB, and the uplink transmission cancellation instruction is sent by the network device to the terminal performing the eMBB.

It should also be noted that the terminal may also directly not monitor the uplink transmission cancellation instruction, without any condition, when the terminal switches a BWP. In this case, it is directly stipulated in a communication protocol that when the terminal switches a bandwidth part (BWP), the terminal does not monitor the uplink transmission cancellation instruction; in specific implementation, for example, when the terminal switches a currently activated uplink BWP, the terminal does not monitor the uplink transmission cancellation instruction; or when the terminal switches a currently activated downlink BWP, the terminal does not monitor the uplink transmission cancellation instruction; or, when the terminal switches the currently activated downlink BWP and the currently activated uplink BWP, the terminal does not monitor the uplink transmission cancellation instruction.

Behaviors of the terminal determining whether to perform monitoring of the uplink transmission cancellation instruction during the BWP switching process in different cases are specifically described as follow.

First case: a case in which the terminal only switches a downlink BWP

Specifically, an implementation manner for determining whether to perform monitoring of the uplink transmission cancellation instruction during the BWP switching process is: according to whether a downlink BWP before or after the switching configures the first configuration information, determining whether to perform monitoring of the uplink transmission cancellation instruction during the BWP switching process.

It should be noted that, in this case, the terminal may determine, according to whether a downlink BWP before the switching configures the first configuration information, whether to perform monitoring of the uplink transmission cancellation instruction during the BWP switching process; that is, when the downlink BWP before the switching configures the first configuration information, it is determined to perform monitoring of the uplink transmission cancellation instruction during the BWP switching process; when the downlink BWP before the switching does not configure the first configuration information, it is determined not to perform monitoring of the uplink transmission cancellation instruction during the BWP switching process.

Specifically, another implementation manner for determining whether to perform monitoring of the uplink transmission cancellation instruction during the BWP switching process is: according to whether the first configuration information configured by a downlink BWP before the switching is the same as the first configuration information configured by a downlink BWP after the switching, determining whether to perform monitoring of the uplink transmission cancellation instruction during the BWP switching process.

It should be noted that, in this case, when the first configuration information configured by the downlink BWP before the switching is the same as the first configuration information configured by the downlink BWP after the switching, it is determined to perform monitoring of the uplink transmission cancellation instruction during the BWP switching process; when the first configuration information configured by the downlink BWP before the switching is different from the first configuration information configured by the downlink BWP after the switching, it is determined not to perform monitoring of the uplink transmission cancellation instruction during the BWP switching process. It should also be noted that when the downlink BWP after the switching does not configure the first configuration information, the terminal also perform an operation according to a case in which the first configuration information configured by the downlink BWP before the switching is different from the first configuration information configured by the downlink BWP after the switching.

How the terminal determines a monitoring behavior is described by way of example hereinafter.

The terminal switches a downlink BWP, a downlink BWP before the switching is a downlink BWP1, and a downlink BWP after the switching is a downlink BWP2.

A1. If the downlink BWP1 configures the first configuration information, but the downlink BWP2 does not configure the first configuration information, the terminal may use one of the following methods A11-A14 when switching a BWP.

A11. The terminal does not monitor the uplink transmission cancellation instruction when switching the downlink BWP.

A12. When switching the downlink BWP, the terminal, according to the downlink BWP1 configuring the first configuration information, determines to monitor the uplink transmission cancellation instruction;

A13. When switching the downlink BWP, the terminal, according to the downlink BWP2 not configuring the first configuration information, determines not to monitor the uplink transmission cancellation instruction.

A14. When the terminal switches the downlink BWP, since the downlink BWP 2 does not configure the first configuration information, the terminal determines, according to the first configuration information of the downlink BWP1 being different from the first configuration information of the downlink BWP2, not to monitor the uplink transmission cancellation instruction.

A2. If the downlink BWP1 configures first configuration information and the downlink BWP2 also configuring first configuration information, the terminal may use one of the following methods A21-A23 when switching a BWP.

A21. The terminal does not monitor the uplink transmission cancellation instruction when switching a downlink BWP.

A22. When switching the downlink BWP, the terminal, according to the first configuration information configured by the downlink BWP1 or the downlink BWP2, determines to monitor the uplink transmission cancellation instruction.

A23. When switching the downlink BWP, the terminal, according to the first configuration information configured by the downlink BWP1 being same as that configured by the downlink BWP2, determines to monitor the uplink transmission cancellation instruction; otherwise, does not monitor the uplink transmission cancellation instruction.

A3. If the downlink BWP1 does not configure first configuration information, but the downlink BWP2 configures first configuration information, the terminal may use one of the following methods A31-A32 when switching a BWP.

A31. The terminal does not monitor the uplink transmission cancellation instruction when switching a downlink BWP.

A32. When switching the downlink BWP, the terminal determines, according to the downlink BWP1 not configuring the first configuration information, not to monitor the uplink transmission cancellation instruction.

Second case: a case in which the terminal only switches an uplink BWP

Specifically, an implementation manner for determining whether to perform monitoring of the uplink transmission cancellation instruction during the BWP switching process is: according to whether an uplink BWP before or after the switching configures the second configuration information, determining whether to perform monitoring of the uplink transmission cancellation instruction during the BWP switching process.

It should be noted that, in this case, the terminal may determine, according to whether an uplink BWP before the switching configures the second configuration information, whether to perform monitoring of the uplink transmission cancellation instruction during the BWP switching process; that is, when the uplink BWP before the switching configures the second configuration information, it is determined to perform monitoring of the uplink transmission cancellation instruction during the BWP switching process; when the uplink BWP before the switching does not configuring the second configuration information, it is determined not to perform monitoring of the uplink transmission cancellation instruction during the BWP switching process.

Specifically, another implementation manner for determining whether to perform monitoring of the uplink transmission cancellation instruction during the BWP switching process is: according to whether the second configuration information configured by an uplink BWP before the switching is the same as the second configuration information configured by an uplink BWP after the switching, determining whether to perform monitoring of the uplink transmission cancellation instruction during the BWP switching process.

It should be noted that, in this case, when the second configuration information configured by the uplink BWP before the switching is the same as the second configuration information configured by the uplink BWP after the switching, it is determined to perform monitoring of the uplink transmission cancellation instruction during the BWP switching process; when the second configuration information configured by the uplink BWP before the switching is different from the second configuration information configured by the uplink BWP after the switching, it is determined not to perform monitoring of the uplink transmission cancellation instruction during the BWP switching process. It should also be noted that when the uplink BWP after the switching does not configuring the second configuration information, the terminal also perform an operation according to a case in which the second configuration information configured by the uplink BWP before the switching is different from the second configuration information configured by the uplink BWP after the switching.

How the terminal determines a monitoring behavior is described by way of example hereinafter.

The terminal switches an uplink BWP, an uplink BWP before the switching is an uplink BWP1, and an uplink BWP after the switching is an uplink BWP2.

B1. If the uplink BWP1 configures the second configuration information, but the uplink BWP2 does not configure the second configuration information, the terminal may use one of the following methods B11-B14 when switching a BWP.

B11. The terminal does not monitor the uplink transmission cancellation instruction when switching the uplink BWP.

B12. When switching the uplink BWP, the terminal, according to the uplink BWP1 configuring the second configuration information, determines to monitor the uplink transmission cancellation instruction;

B13. When switching the uplink BWP, the terminal, according to the uplink BWP2 not configuring the second configuration information, determines not to monitor the uplink transmission cancellation instruction.

B14. When the terminal switches the uplink BWP, since the uplink BWP2 does not configure the second configuration information, the terminal determines, according to the second configuration information of the uplink BWP1 being different from the second configuration information of the uplink BWP2, not to monitor the uplink transmission cancellation instruction.

B2. If the uplink BWP1 configures second configuration information and the uplink BWP2 also configures second configuration information, the terminal may use one of the following methods B21-B23 when switching a BWP.

B21. The terminal does not monitor the uplink transmission cancellation instruction when switching an uplink BWP.

B22. When switching the uplink BWP, the terminal, according to the second configuration information configured by the uplink BWP1 or the uplink BWP2, determines to monitor the uplink transmission cancellation instruction.

B23. When switching the uplink BWP, the terminal, according to the second configuration information configured by the uplink BWP1 being same as that configured by the uplink BWP2, determines to monitor the uplink transmission cancellation instruction; otherwise, does not monitor the uplink transmission cancellation instruction.

B3. If the uplink BWP1 does not configures second configuration information, but the uplink BWP2 configures second configuration information, then the terminal may use one of the following methods B31-B33 when switching a BWP.

B31. The terminal does not monitor the uplink transmission cancellation instruction when switching an uplink BWP.

B32. When switching the uplink BWP, the terminal determines, according to the uplink BWP1 not configuring the second configuration information, not to monitor the uplink transmission cancellation instruction.

B33. When switching the uplink BWP, the terminal determines, according to the uplink BWP2 configuring the second configuration information, to monitor the uplink transmission cancellation instruction.

Third case: a case in which the terminal performs switching of an uplink BWP and switching of a downlink BWP concurrently.

Specifically, an implementation manner for determining whether to perform monitoring of the uplink transmission cancellation instruction during the BWP switching process is: according to whether an uplink BWP and a downlink BWP before or after the switching configure complete configuration information, determining whether to perform monitoring of the uplink transmission cancellation instruction during the BWP switching process, wherein the complete configuration information means that the downlink BWP configures the first configuration information and the uplink BWP configures the second configuration information.

A specific implementation manner in this case is: if the uplink BWP before the switching configures the second configuration information and the downlink BWP before the switching also configures the first configuration information, then performing monitoring of the uplink transmission cancellation instruction during the BWP switching process; if the uplink BWP before the switching configures the second configuration information, but the downlink BWP before the switching does not configure the first configuration information, not performing monitoring of the uplink transmission cancellation instruction during the BWP switching process; if the uplink BWP before the switching does not configure the second configuration information, but the downlink BWP before the switching configures the first configuration information, not performing monitoring of the uplink transmission cancellation instruction during the BWP switching process; if the uplink BWP after the switching configures the second configuration information, and the downlink BWP after the switching configures the first configuration information, then performing monitoring of the uplink transmission cancellation instruction during the BWP switching process; if the uplink BWP after the switching configures the second configuration information, but the downlink BWP after the switching does not configure the first configuration information, then not performing monitoring of the uplink transmission cancellation instruction during the BWP switching process; if the uplink BWP after the switching does not configure the second configuration information, but the downlink BWP after the switching configures the first configuration information, then not performing monitoring of the uplink transmission cancellation instruction during the BWP switching process It should also be noted that when the terminal is in a currently activated BWP, the terminal may initiate physical uplink shared channel (PUSCH) transmission by receiving downlink control information (DCI) for scheduling uplink transmission. In this case, if the terminal does not receive the DCI for scheduling uplink transmission, the terminal does not monitor the uplink transmission cancellation instruction. If the terminal receives the DCI for scheduling uplink transmission, the terminal monitors the uplink transmission cancellation instruction.

Further, when the terminal switches a BWP, monitoring may also be performed in this manner, that is, as long as the terminal does not receive the DCI for scheduling uplink transmission, the terminal does not monitor the uplink transmission cancellation instruction.

For example, if the terminal does not receive the DCI for scheduling PUSCH transmission, the terminal does not need to monitor the uplink transmission cancellation instruction, wherein the DCI scrambles cyclic redundancy check code (CRC) through at least one of a cell radio network temporary identification (C-RNTI), semi-persistent scheduling radio network temporary identifier (CS-RNTI) or a semi-persistent channel state indication report radio network temporary identifier (SP-CSI-RNTI).

After the terminal monitors the uplink transmission cancellation instruction and detects the uplink transmission cancellation instruction, the terminal also needs to perform subsequent operations according to the uplink transmission cancellation instruction. Optionally, after monitoring the uplink transmission cancellation instruction, the method of monitoring the uplink transmission cancellation instruction in the embodiment of the present disclosure also includes: after detecting the uplink transmission cancellation instruction, determining a time-frequency resource of a cancelled uplink transmission according to configuration information of an uplink transmission cancellation instruction of the first BWP; wherein, the first BWP includes at least one of: an uplink BWP before switching, a downlink BWP before switching, an uplink BWP after switching, or a downlink BWP after switching; it should be emphasized here that for the uplink BWP, the configuration information refers to the aforementioned second configuration information, and for the downlink BWP, the aforementioned configuration information refers to the aforementioned first configuration information.

Optionally, after monitoring the uplink transmission cancellation instruction, the method of monitoring the uplink transmission cancellation instruction in the embodiment of the present disclosure further includes: after detecting the uplink transmission cancellation instruction, determining a time-frequency resource of a cancelled uplink transmission according to second preset configuration information.

It should be noted that the second preset configuration information includes a configured uplink BWP; it should be noted that the configured uplink BWP includes the currently activated uplink BWP. Optionally, when determining the time-frequency resource of the cancelled uplink transmission, the terminal may determine a frequency domain resource of the uplink transmission needing to be cancelled as a frequency domain resource of the uplink BWP according to the uplink BWP where the scheduled uplink transmission is located.

Optionally, after monitoring the uplink transmission cancellation instruction, the method of monitoring the uplink transmission cancellation instruction in the embodiment of the present disclosure further includes: after detecting the uplink transmission cancellation instruction, ignoring the detected uplink transmission cancellation instruction.

It should be noted that when switching a BWP occurs, the terminal may learn the configuration information of the uplink transmission cancellation instruction of the BWP before the switching and the configuration information of the uplink transmission cancellation instruction of the BWP after the switching. The two may be the same or different. Further, a specific implementation of the step of ignoring the detected uplink transmission cancellation instruction may be: in a case that the configuration information of the uplink transmission cancellation instruction of the BWP before the switching and the configuration information of the uplink transmission cancellation instruction of the BWP after the switching are at least partially different (including completely different and partly the same), ignoring the detected uplink transmission cancellation instruction; in a case that the configuration information of the uplink transmission cancellation instruction of the BWP before the switching and the configuration information of the uplink transmission cancellation instruction of the BWP after the switching are the same, the terminal will not ignore the detected uplink transmission cancellation instruction.

An example of a subsequent behavior of the terminal after detecting the uplink transmission cancellation instruction is described by way of example as follows.

First case: if the terminal switches the downlink BWP, and the terminal detects the uplink transmission cancellation instruction, then the terminal may perform one of the following methods C1-C2.

C1. The terminal determines a time-frequency resource of a cancelled uplink transmission according to configuration information of the uplink transmission cancellation instruction of the downlink BWP before switching.

It should be noted that the configuration information of the uplink transmission cancellation instruction may be a signaling format, a signaling size, and the like of the uplink transmission cancellation instruction.

C2. The terminal ignores the detected uplink transmission cancellation instruction.

It should be noted that in this case, even if the terminal detects the uplink transmission cancellation instruction, the terminal does not cancel the uplink transmission according to the uplink transmission cancellation instruction, but continues to perform the uplink transmission according to a state before the uplink transmission cancellation instruction is detected.

Second case: if the terminal switches an uplink BWP, and the terminal detects the uplink transmission cancellation instruction, the terminal may perform one of the following methods D1-D4.

D1. The terminal determines a time-frequency resource of a cancelled uplink transmission according to the configuration information of the uplink transmission cancellation instruction of the uplink BWP before switching.

It should be noted that the configuration information of the uplink transmission cancellation instruction of the uplink BWP before the switching is information such as a time-domain or frequency-domain indication mode, a granularity, and a reference time-frequency region size of the uplink transmission cancellation instruction.

D2. The terminal determines the time-frequency resource of a cancelled uplink transmission according to the configuration information of the uplink transmission cancellation instruction of the uplink BWP after the switching.

It should be noted that the configuration information of the uplink transmission cancellation instruction of the uplink BWP after the switching is information such as a time-domain or frequency-domain indication mode, a granularity, and a reference time-frequency region size of the uplink transmission cancellation instruction.

D3. The terminal determines that a frequency domain resource of a cancelled uplink transmission is a frequency domain resource of an uplink BWP where the scheduled uplink transmission is located.

D4. The terminal ignores the detected uplink transmission cancellation instruction.

It should be noted that in this case, even if the terminal detects the uplink transmission cancellation instruction, the terminal does not cancel the uplink transmission according to the uplink transmission cancellation instruction, but continues to perform the uplink transmission according to the state before the uplink transmission cancellation instruction is detected.

The embodiment of the present disclosure provides behaviors of the terminal detecting and receiving the uplink transmission cancellation instruction when at least one of the uplink BWP or the downlink BWP is switched, thus avoiding ambiguous understanding of the terminal before and after switching at least one of the uplink BWP or the downlink BWP. In this way, it is ensured that the terminal may accurately obtain the uplink transmission cancellation instruction before and after the switching, and reliability of communication is ensured.

Figure 2:
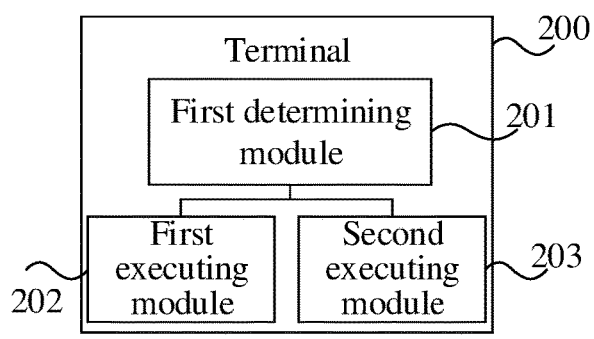
FIG. 2 is a first schematic diagram of modules of a terminal according to an embodiment of the present disclosure.

As shown in FIG. 2, an embodiment of the present disclosure further provides a terminal 200. The terminal includes a first determining module 201, a first executing module 202, and a second executing module 203.

The first determining module 201 is used to: when the terminal switches a bandwidth part (BWP), determine, according to first preset configuration information, whether to perform monitoring of an uplink transmission cancellation instruction during a BWP switching process.

The first executing module 202 is used to: when the monitoring of the uplink transmission cancellation instruction is determined to be performed, monitor the uplink transmission cancellation instruction during the BWP switching process.

The second executing module 203 is used to: when the monitoring of the uplink transmission cancellation instruction is determined not to be performed, not monitor the uplink transmission cancellation instruction during the BWP switching process.

Specifically, first preset configuration information includes at least one of: first configuration information of the uplink transmission cancellation instruction configured by a downlink BWP or second configuration information of the uplink transmission cancellation instruction configured by an uplink BWP.

Specifically, when only switching of a downlink BWP occurs in the terminal, the first executing module is used to: according to whether a downlink BWP before or after the switching configures the first configuration information, determine whether to perform monitoring of the uplink transmission cancellation instruction during the BWP switching process.

Specifically, when only switching of a downlink BWP occurs in the terminal, the first executing module is used to: according to whether the first configuration information configured by the downlink BWP before the switching is the same as the first configuration information configured by the downlink BWP after the switching, determine whether to perform monitoring of the uplink transmission cancellation instruction during the BWP switching process.

Specifically, when only switching of an uplink BWP occurs in the terminal, the first executing module is used to: according to whether an uplink BWP before or after the switching configures the second configuration information, determine whether to perform monitoring of the uplink transmission cancellation instruction during the BWP switching process.

Specifically, when only switching of an uplink BWP occurs in the terminal, the first executing module is used to: according to whether second configuration information configured by the uplink BWP before the switching is the same as the second configuration information configured by the uplink BWP after the switching, determine whether to perform monitoring of the uplink transmission cancellation instruction during the BWP switching process.

Specifically, when the terminal simultaneously performs switching of a downlink BWP and switching of an uplink BWP, the first executing module is used to: according to whether an uplink BWP and a downlink BWP before or after the switching configure complete configuration information, determine whether to perform monitoring of the uplink transmission cancellation instruction during the BWP switching process, wherein the complete configuration information means that the downlink BWP configures the first configuration information and the uplink BWP configures the second configuration information Further, the terminal further includes a third executing module used to: not monitor the uplink transmission cancellation instruction when the terminal does not receive downlink control information for scheduling uplink transmission.

Specifically, after the first executing module monitors the uplink transmission cancellation instruction during the BWP switching process, the terminal further includes a second determining module used to: after detecting the uplink transmission cancellation instruction, determine a time-frequency resource of a cancelled uplink transmission according to configuration information of an uplink transmission cancellation instruction of the first BWP; wherein, the first BWP includes at least one of: an uplink BWP before switching, a downlink BWP before switching, an uplink BWP after switching, or a downlink BWP after switching.

Specifically, after the first executing module monitors the uplink transmission cancellation instruction during the BWP switching process, the terminal further includes a third determining module used to: after detecting the uplink transmission cancellation instruction, determine a time-frequency resource of a cancelled uplink transmission according to second preset configuration information.

Specifically, the second preset configuration information includes a configured uplink BWP.

Further, after the first executing module monitors the uplink transmission cancellation instruction during the BWP switching process, the terminal further includes a fourth executing module used to: after detecting the uplink transmission cancellation instruction, ignore the detected uplink transmission cancellation instruction.

Specifically, the fourth executing module is used to: in a case that the configuration information of the uplink transmission cancellation instruction of the BWP before the switching and the configuration information of the uplink transmission cancellation instruction of the BWP after the switching are at least partially different, ignore the detected uplink transmission cancellation instruction.

The terminal 200 provided in the embodiment of the present disclosure may implement each process implemented by the terminal 200 in the method embodiment of FIG. 1, and to avoid repetition, details thereof are not described herein again. The terminal 200 of the embodiment of the present disclosure clarifies the behavior of terminal monitoring the uplink transmission cancellation instruction when the terminal switches the BWP, thereby ensuring that the terminal may accurately obtain the uplink transmission cancellation instruction before and after the switching, and ensure the reliability of communication.

Figure 3:
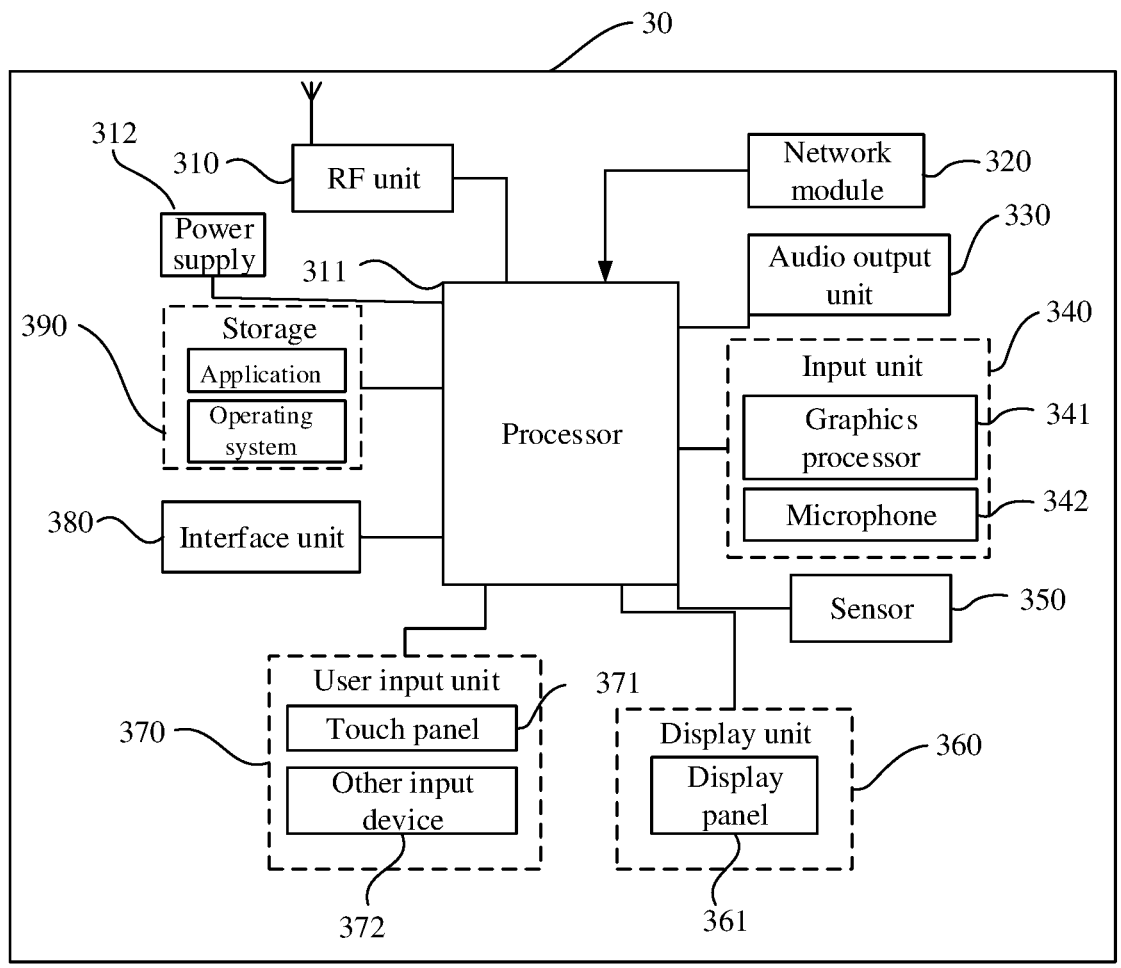
FIG. 3 is a first structural block diagram of a terminal according to an embodiment of the present disclosure.

FIG. 3 is a schematic diagram of a hardware structure of a terminal for implementing an embodiment of the present disclosure.

The terminal 30 includes but is not limited to: a radio frequency unit 310, a network module 320, an audio output unit 330, an input unit 340, a sensor 350, a display unit 360, a user input unit 370, an interface unit 380, a storage 390, a processor 311, and a power supply 312 and other components. Those skilled in the art may understand that a structure of the terminal shown in FIG. 3 does not form a limitation of the terminal of the present disclosure. The terminal may include more or fewer components than shown in the figure, or some combined components, or different arrangements of components. In some embodiments of the present disclosure, the terminal includes, but is not limited to, a mobile phone, a tablet computer, a notebook computer, a palmtop computer, a vehicle-mounted terminal, a wearable device, a pedometer, and the like.

The processor 311 is used for: when the terminal switches a bandwidth part (BWP), determining, according to first preset configuration information, whether to perform monitoring of the uplink transmission cancellation instruction during a BWP switching process; when the monitoring of the uplink transmission cancellation instruction is determined to be performed, monitoring the uplink transmission cancellation instruction during the BWP switching process; when the monitoring of the uplink transmission cancellation instruction is determined not to be performed, not monitoring the uplink transmission cancellation instruction during the BWP switching process.

The terminal in the embodiment of the present disclosure clarifies the behavior of the terminal for monitoring the uplink transmission cancellation instruction, the terminal may be ensured to accurately obtain the uplink transmission cancellation instruction before and after the switching is performed, and reliability of communication is ensured.

It should be understood that, in the embodiment of the present disclosure, the radio frequency unit 310 is used for receiving and transmitting signals in processes of transmitting and receiving information or talking. Specifically, after the radio frequency unit receives downlink data from the network device, and the downlink data is transferred by the radio frequency unit to the processor 311 for processing; and additionally the radio frequency unit sends uplink data to the network device. Generally, the radio frequency unit 310 includes, but is not limited to, an antenna, at least one amplifier, a transceiver, a coupler, a low noise amplifier, a duplexer, or the like. In addition, the radio frequency unit 310 may also communicate with a network and other devices through a wireless communication system.

The terminal provides a wireless broadband internet access to a user through the network module 320, such as helping the user to send and receive emails, browse web pages, access streaming media, and the like.

The audio output unit 330 may convert audio data received by the radio frequency unit 310 or the network module 320 or stored in the storage 390 into an audio signal and output the audio signal as sound. The audio output unit 330 may also provide audio output (e.g., a call signal reception sound, a message reception sound, etc.) related to a specific function performed by the terminal 30. The audio output unit 330 includes a speaker, a buzzer, a receiver, and the like.

The input unit 340 is used to receive an audio or video signal. The input unit 340 may include a graphic processor (Graphics Processing Unit, GPU) 3141 and a microphone 342. The graphics processing unit 341 processes image data of a still picture or a video obtained by an image capturing device such as a camera in a video capturing mode or an image capturing mode. The processed image frame may be displayed on the display unit 360. Image frames processed by the graphics processing unit 341 may be stored in the storage 390 (or other storage media) or sent via the radio frequency unit 310 or the network module 320. The microphone 342 may receive sound and be able to process such sound into audio data. The processed audio data may be converted, in a case of a telephone communication mode, into a format output that may be sent to a mobile communication base station via the radio frequency unit 310.

The terminal 30 also includes at least one sensor 350, such as a light sensor, a motion sensor, and other sensors. In particular, the light sensor includes an ambient light sensor and a proximity sensor, wherein the ambient light sensor may adjust brightness of the display panel 361 according to brightness of ambient light. The proximity sensor may turn off the display panel 361 and/or a backlight when the terminal 30 moves close to the ear. As one type of motion sensor, the accelerometer sensor can detect a value of an acceleration in each direction (generally the three axes directions), and can detect a magnitude and a direction of gravity when being stationary, can be used to recognize a posture of a terminal (such as horizontal-vertical screen switching, a related game, a magnetometer posture calibration), a vibration-recognition related function (such as a pedometer, tapping), and the like. The sensor 350 may further include a fingerprint sensor, a pressure sensor, an iris sensor, a molecular sensor, a gyroscope, a barometer, a hygrometer, a thermometer, an infrared sensor, and the like, which will not be described herein.

The display unit 360 is used to display information inputted by the user or information provided to the user. The display unit 360 may include a display panel 361 that may be configured in the form of a liquid crystal display (LCD), an organic light-emitting diode (OLED), or the like.

The user input unit 370 may be used to receive inputted digital or character information and generate a key signal input related to user-setting and function control of the terminal. Specifically, the user input unit 370 includes a touch panel 371 and other input devices 372. The touch panel 371, also referred to as a touch screen, may collect a touch operation (e.g., an operation of a user using any suitable object or accessory, such as a finger, stylus, or the like, on or near the touch panel 371) of the user on or near the touch panel 371. The touch panel 371 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 311, and receives and executes commands from the processor 311. In addition, the touch panel 371 may be implemented in various types such as a resistance type, a capacitance type, an infrared ray, and a surface acoustic wave. The user input unit 370 may also include other input devices 372 in addition to the touch panel 371. Specifically, the other input devices 372 may include, but are not limited to, a physical keyboard, function keys (such as volume control keys, switch keys, etc.), a trackball, a mouse, and a joystick, which will not be described herein.

Further, the touch panel 371 may be overlaid on the display panel 361, and after the touch panel 371 detects a touch operation on or near the touch panel 371, the touch operation is sent by touch panel 371 to the processor 311 to determine the type of a touch event. The processor 311 then provides a corresponding visual output on the display panel 361 according to the type of the touch event. Although in FIG. 3, the touch panel 371 and the display panel 361 are two separate components for implementing input and output functions of the terminal, the input and output functions of the terminal in some embodiments may be realized by integrating the touch panel 371 with the display panel 361, and the present disclosure is not limited thereto.

The interface unit 380 is an interface in which an external device is connected to the terminal 30. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 380 may be used to receive input (e.g., data information, power, etc.) from an external device and transmit the received input to one or more elements within the terminal 30 or may be used to transmit data between the terminal 30 and the external device.

The storage 390 may be used to store software programs and various types of data. The storage 390 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 390 may include a high speed random access memory, and may also include a non-transitory memory, such as at least one disk storage device, a flash memory device, or other volatile solid state storage device.

The processor 311 is a console of the terminal, connects various parts of the entirety of the terminal using various interfaces and lines, and executes various functions and processes data of the terminal by running or executing software programs and/or modules stored in the storage 390, and by calling data stored in the storage 390, thereby integrally monitoring the terminal. The processor 311 may include one or more processing units; optionally, the processor 311 may integrate an application processor and a modem processor, wherein the application processor primarily processes an operating system, a user interface, an application program, etc. The modem processor mainly handles wireless communication. It will be appreciated that the above-described modem processor may also not be integrated into the processor 311.

The terminal 30 may also include a power supply 312 (such as a battery) that supplies power to various components, optionally, the power supply 312 may be logically connected to the processor 311 via a power management system. Thus, functions such as charging, discharging, and power consumption management are managed by the power management system.

In addition, the terminal 30 includes some functional modules not shown, which will not be described here.

Optionally, the embodiments of the present disclosure further provide a terminal. The terminal includes a processor 311, a storage 390, and a computer program stored on the storage 390 and executable on the processor 311, wherein when the computer program is executed by the processor 311, the processor 311 implements various processes of the method of monitoring the uplink transmission cancellation instruction applied to a terminal side in the embodiments of the present disclosure, and the same technical effect may be achieved. To avoid repetition, description thereof is not repeated herein.

The embodiments of the present disclosure further provide a computer readable storage medium. The computer readable storage medium stores a computer program. When the computer program is executed by a processor, the processor implements the various processes of the method of monitoring the uplink transmission cancellation instruction applied to a terminal side in the embodiments of the present disclosure, and the same technical effect may be achieved. To avoid repetition, description thereof is not repeated herein. The computer readable storage medium may be such as a read-only memory (ROM), a random access memory (RAM), a magnetic disk or a compact disc.

Figure 4:
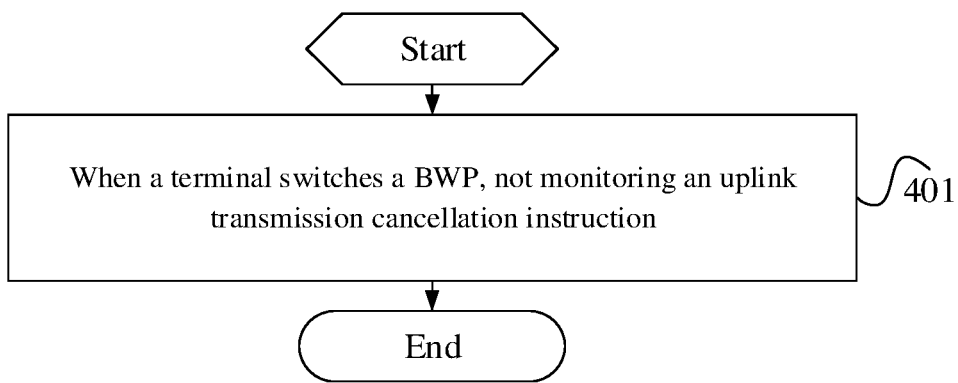
FIG. 4 shows a second schematic flowchart of a method of monitoring an uplink transmission cancellation instruction according to an embodiment of the present disclosure.

As shown in FIG. 4, another method of monitoring an uplink transmission cancellation instruction applied to a terminal according to an embodiment of the present disclosure includes a step 401.

Step 401: when the terminal switches a bandwidth part (BWP), not monitoring the uplink transmission cancellation instruction.

Specifically, the BWP includes at least one of an uplink BWP or a downlink BWP, and the BWP switched by the terminal is a currently activated BWP.

In this case, it is directly stipulated in a communication protocol that when the terminal switches a bandwidth part (BWP), the terminal does not monitor the uplink transmission cancellation instruction; in specific implementation, for example, when the terminal switches a currently activated uplink BWP, the terminal does not monitor the uplink transmission cancellation instruction; or when the terminal switches a currently activated downlink BWP, the terminal does not monitor the uplink transmission cancellation instruction; or, when the terminal switches the currently activated downlink BWP and the currently activated uplink BWP, the terminal does not monitor the uplink transmission cancellation instruction.

Figure 5:
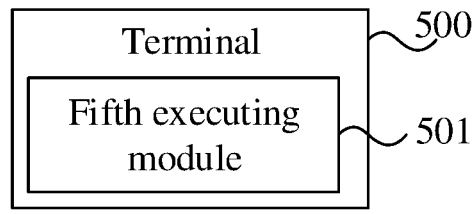
FIG. 5 is a second schematic diagram of modules of a terminal according to an embodiment of the present disclosure.

As shown in FIG. 5, corresponding to the method of monitoring the uplink transmission cancellation instruction in FIG. 4, an embodiment of the present disclosure further provides a terminal 500. The terminal 500 includes a fifth executing module 501 used to not monitor the uplink transmission cancellation instruction when the terminal switches the bandwidth part of the BWP; wherein, BWP includes at least one of an uplink BWP or a downlink BWP.

It should be noted that the terminal of the embodiment of the present disclosure clarifies the behavior of the terminal for monitoring the uplink transmission cancellation instruction when the terminal switches the BWP, ensuring that the terminal may accurately obtain the uplink transmission cancellation instruction before and after the switching, and ensuring the reliability of communication.

Figure 6:
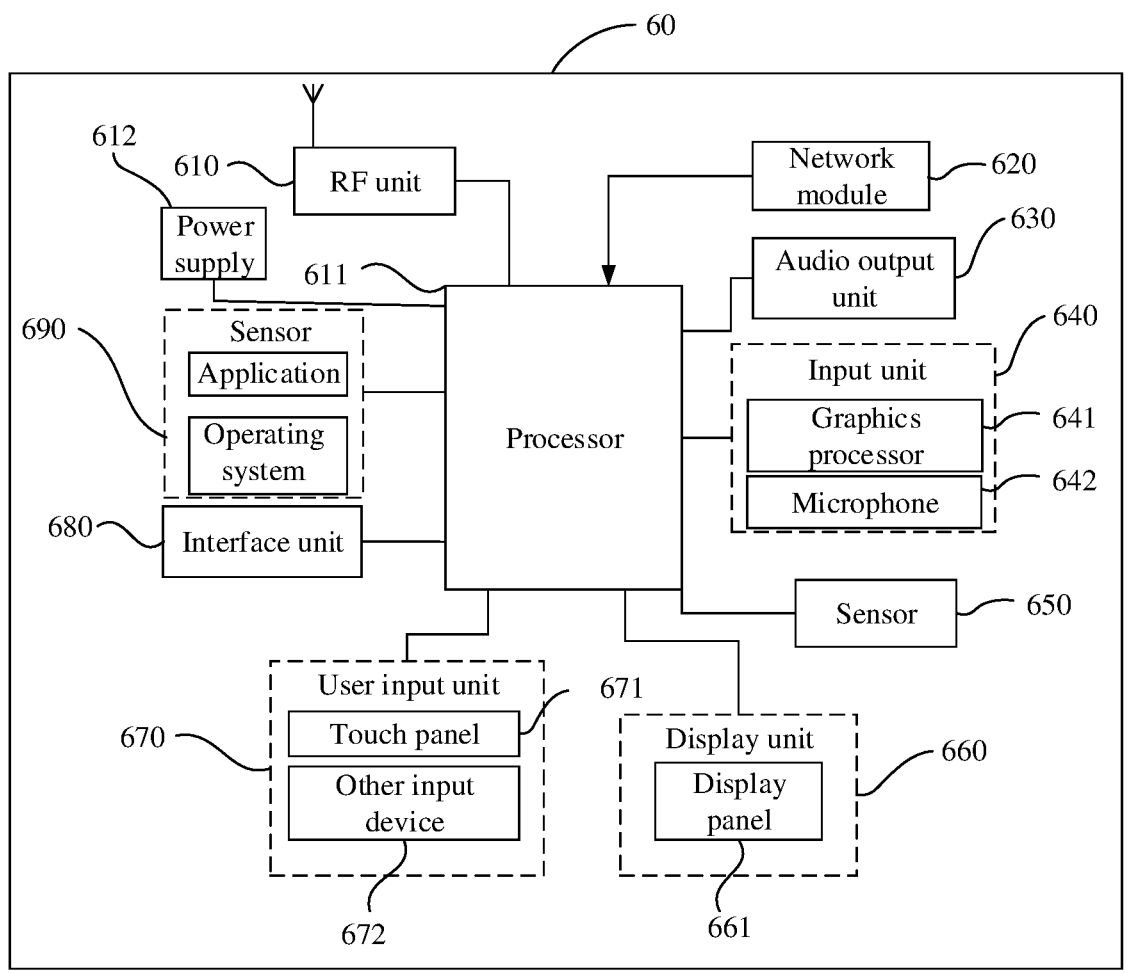
FIG. 6 is a second structural block diagram of a terminal according to an embodiment of the present disclosure.

FIG. 6 is a schematic diagram of a hardware structure of a terminal for implementing an embodiment of the present disclosure.

The terminal 60 includes, but is not limited to, a radio frequency unit 610, a network module 620, an audio output unit 630, an input unit 640, a sensor 650, a display unit 660, a user input unit 660, an interface unit 680, a storage 690, a processor 611, and a power supply 612 and other components. Those skilled in the art may understand that a structure of the terminal shown in FIG. 6 does not form a limitation of the terminal. The terminal may include more or fewer components than shown in the figure, or some combined components, or different arrangements of components. In some embodiments of the present disclosure, the terminal includes, but is not limited to, a mobile phone, a tablet computer, a notebook computer, a palmtop computer, a vehicle-mounted terminal, a wearable device, a pedometer, and the like.

The processor 611 is used for: when the terminal switches a bandwidth part (BWP), not monitoring the uplink transmission cancellation instruction.

Specifically, the BWP includes at least one of an uplink BWP or a downlink BWP.

The embodiment of the present disclosure clarifies the behavior of the terminal for monitoring the uplink transmission cancellation instruction when the terminal switches the BWP, ensuring that the terminal may accurately obtain the uplink transmission cancellation instruction before and after the switching, and ensuring the reliability of communication.

It should be understood that, in the embodiment of the present disclosure, the radio frequency unit 610 is used for receiving and transmitting signals in processes of transmitting and receiving information or talking. Specifically, after the radio frequency unit 610 receives downlink data from the network device, and the downlink data is transferred by the radio frequency unit 610 to the processor 611 for processing; and additionally the radio frequency unit 610 sends uplink data to the network device. Generally, the radio frequency unit 610 includes, but is not limited to, an antenna, at least one amplifier, a transceiver, a coupler, a low noise amplifier, a duplexer, or the like. In addition, the radio frequency unit 610 may also communicate with a network and other devices through a wireless communication system.

The terminal provides a wireless broadband internet access to a user through the network module 620, such as helping the user to send and receive emails, browse web pages, access streaming media, and the like.

The audio output unit 630 may convert audio data received by the radio frequency unit 610 or the network module 620 or stored in the storage 690 into an audio signal and output the audio signal as sound. The audio output unit 630 may also provide audio output (e.g., a call signal reception sound, a message reception sound, etc.) related to a specific function performed by the terminal 60. The audio output unit 630 includes a speaker, a buzzer, a receiver, and the like.

The input unit 640 is used to receive an audio or video signal. The input unit 640 may include a graphic processor (GPU) 641 and a microphone 642. The graphics processing unit 641 processes image data of a still picture or a video obtained by an image capturing device such as a camera in a video capturing mode or an image capturing mode. The processed image frame may be displayed on the display unit 660. Image frames processed by the graphics processing unit 641 may be stored in the storage 690 (or other storage media) or sent via the radio frequency unit 610 or the network module 620. The microphone 6402 may receive sound and be able to process such sound into audio data. The processed audio data may be converted, in a case of a telephone communication mode, into a format output that may be sent to a mobile communication base station via the radio frequency unit 610.

The terminal 60 also includes at least one sensor 650, such as a light sensor, a motion sensor, and other sensors. In particular, the light sensor includes an ambient light sensor and a proximity sensor, wherein the ambient light sensor may adjust brightness of the display panel 661 according to brightness of ambient light. The proximity sensor may turn off the display panel 661 and/or a backlight when the terminal 60 moves close to the ear. As one type of motion sensor, the accelerometer sensor can detect a value of an acceleration in each direction (generally the three axes directions), and can detect a magnitude and a direction of gravity when being stationary, can be used to recognize a posture of a terminal (such as horizontal-vertical screen switching, a related game, a magnetometer posture calibration), a vibration-recognition related function (such as a pedometer, tapping), and the like. The sensor 650 may further include a fingerprint sensor, a pressure sensor, an iris sensor, a molecular sensor, a gyroscope, a barometer, a hygrometer, a thermometer, an infrared sensor, and the like, which will not be described herein.

The display unit 660 is used to display information inputted by the user or information provided to the user. The display unit 660 may include a display panel 661 that may be configured in the form of a liquid crystal display (LCD), an organic light-emitting diode (OLED), or the like.

The user input unit 670 may be used to receive inputted digital or character information and generate a key signal input related to user-setting and function control of the terminal. Specifically, the user input unit 670 includes a touch panel 671 and other input devices 672. The touch panel 671, also referred to as a touch screen, may collect a touch operation (e.g., an operation of a user using any suitable object or accessory, such as a finger, stylus, or the like, on or near the touch panel 671) of the user on or near the touch panel 671. The touch panel 671 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 611, and receives and executes commands from the processor 611. In addition, the touch panel 671 may be implemented in various types such as a resistance type, a capacitance type, an infrared ray, and a surface acoustic wave. The user input unit 670 may also include other input devices 672 in addition to the touch panel 671. Specifically, the other input devices 672 may include, but are not limited to, a physical keyboard, function keys (such as volume control keys, switch keys, etc.), a trackball, a mouse, and a joystick, which will not be described herein.

Further, the touch panel 671 may be overlaid on the display panel 661, and after the touch panel 671 detects a touch operation on or near the touch panel 671, the touch operation is sent by touch panel 671 to the processor 611 to determine the type of a touch event. The processor 611 then provides a corresponding visual output on the display panel 661 according to the type of the touch event. Although in FIG. 6, the touch panel 671 and the display panel 661 are two separate components for implementing input and output functions of the terminal, the input and output functions of the terminal in some embodiments may be realized by integrating the touch panel 671 with the display panel 661, and the present disclosure is not limited thereto.

The interface unit 680 is an interface in which an external device is connected to the terminal 60. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 680 may be used to receive input (e.g., data information, power, etc.) from an external device and transmit the received input to one or more elements within the terminal 60 or may be used to transmit data between the terminal 60 and the external device.

The storage 690 may be used to store software programs and various types of data. The storage 690 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 690 may include a high speed random access memory, and may also include a non-transitory memory, such as at least one disk storage device, a flash memory device, or other volatile solid state storage device.

The processor 611 is a console of the terminal, connects various parts of the entirety of the terminal using various interfaces and lines, and executes various functions and processes data of the terminal by running or executing software programs and/or modules stored in the storage 690, and by calling data stored in the storage 690, thereby integrally monitoring the terminal. The processor 611 may include one or more processing units; optionally, the processor 611 may integrate an application processor and a modem processor, wherein the application processor primarily processes an operating system, a user interface, an application program, etc. The modem processor mainly handles wireless communication. It will be appreciated that the above-described modem processor may also not be integrated into the processor 611.

The terminal 60 may also include a power supply 612 (such as a battery) that supplies power to various components, optionally, the power supply 612 may be logically connected to the processor 611 via a power management system. Thus, functions such as charging, discharging, and power consumption management are managed by the power management system.

In addition, the terminal 60 includes some functional modules not shown, which will not be described here.

Optionally, the embodiments of the present disclosure further provide a terminal. The terminal includes a processor 611, a storage 690, and a computer program stored on the storage 690 and executable on the processor 611, wherein when the computer program is executed by the processor 611, the processor 611 implements various processes of the method of monitoring the uplink transmission cancellation instruction applied to a terminal side in the embodiments of the present disclosure, and the same technical effect may be achieved. To avoid repetition, description thereof is not repeated herein.

The embodiments of the present disclosure further provide a computer readable storage medium. The computer readable storage medium stores a computer program. When the computer program is executed by a processor, the processor implements the various processes of the method of monitoring the uplink transmission cancellation instruction applied to a terminal side in the embodiments of the present disclosure, and the same technical effect may be achieved. To avoid repetition, description thereof is not repeated herein. The computer readable storage medium may be such as a read-only memory (ROM), a random access memory (RAM), a magnetic disk or a compact disc.

It should be noted that the network device mentioned in the embodiments of the present disclosure may be a base station (BTS) in a global system of mobile communication (GSM) or a code division multiple access (CDMA), may also be a base station (NB) in wideband code division multiple access (WCDMA), or an evolved base station (eNB or eNodeB) in a LTE, or a relay station or an access point, or a base station in a future 5G network, which is not limited here.

It should be noted that such terms as "including", "comprising" or any other variation thereof herein are intended to encompass non-exclusive inclusions such that a process, method, article or device including a series of elements includes not only those elements, but also other elements that are not explicitly listed, or elements inherent to such a process, method, article or user equipment. An element after a statement "including" does not exclude presence of further identical elements in the process, method, article or device that includes the element, if without further limitation.

Through description of the above embodiments, those skilled in the art can clearly understand that the method of the above embodiments can be implemented by means of software plus a necessary general hardware platform, but of course, can also be implemented by hardware, but in many cases the former is better implementation. Based on this understanding, the essential part of the technical solutions of the present disclosure or a part that contributes to the related art can be embodied in the form of a software product. The computer software product is stored in a storage medium (such as a ROM/RAM, a magnetic disk, an optical disk) and includes several instructions to make a terminal (which can be a mobile phone, a computer, a server, an air-conditioner, or a network device, etc.) execute the methods described in the various embodiments of the present disclosure.

The embodiments described above are optional embodiments of the present disclosure. It should be pointed out that various embellishments and improvements may also be made within in the principle of the present disclosure, and such various embellishments and improvements are also within the protection scope of the present disclosure.

What is claimed is:

1. A method of monitoring an uplink transmission cancellation instruction, comprising:
   when a terminal switches a bandwidth part (BWP), determining, by the terminal according to first preset configuration information, whether to perform monitoring of uplink transmission cancellation instruction during a BWP switching process;
   when the monitoring of the uplink transmission cancellation instruction is determined to be performed, monitoring the uplink transmission cancellation instruction during the BWP switching process by the terminal;
   when the monitoring of the uplink transmission cancellation instruction is determined not to be performed, not monitoring the uplink transmission cancellation instruction during the BWP switching process by the terminal,
   wherein,
   the first preset configuration information comprises at least one of: first configuration information of an uplink transmission cancellation instruction configured by a downlink BWP, or second configuration information of an uplink transmission cancellation instruction configured by an uplink BWP;
   when only switching of the uplink BWP occurs in the terminal, determining whether to perform the monitoring of the uplink transmission cancellation instruction during the BWP switching process by the terminal comprises:
   according to whether the uplink BWP before or after the switching configures the second configuration information, determining whether to perform the monitoring of the uplink transmission cancellation instruction during the BWP switching process by the terminal; or,
   when only switching of the uplink BWP occurs in the terminal, determining whether to perform the monitoring of the uplink transmission cancellation instruction during the BWP switching process by the terminal comprises:
   according to whether the second configuration information configured by the uplink BWP before the switching is same as the second configuration information configured by the uplink BWP after the switching, determining whether to perform the monitoring of the uplink transmission cancellation instruction during the BWP switching process by the terminal; or,
   when the terminal performs switching of the uplink BWP and switching of the downlink BWP concurrently, determining whether to perform the monitoring of the uplink transmission cancellation instruction during the BWP switching process by the terminal comprises:
   according to whether the uplink BWP and the downlink BWP before or after the switching configure complete configuration information, determining whether to perform the monitoring of the uplink transmission cancellation instruction during the BWP switching process by the terminal, wherein the complete configuration information indicates that the downlink BWP configures the first configuration information and the uplink BWP configures the second configuration information.

2. The method of monitoring the uplink transmission cancellation instruction according to claim 1, further comprising: not monitoring the uplink transmission cancellation instruction by the terminal when the terminal does not receive downlink control information for scheduling uplink transmission.

3. The method of monitoring the uplink transmission cancellation instruction according to claim 1, wherein after monitoring the uplink transmission cancellation instruction during the BWP switching process by the terminal, the method further comprises: after detecting the uplink transmission cancellation instruction, determining a time-frequency resource of a cancelled uplink transmission according to configuration information of the uplink transmission cancellation instruction of a first BWP by the terminal; wherein, the first BWP includes at least one of: an uplink BWP before switching, a downlink BWP before switching, an uplink BWP after switching, or a downlink BWP after switching.

4. The method of monitoring the uplink transmission cancellation instruction according to claim 1, wherein after monitoring the uplink transmission cancellation instruction during the BWP switching process by the terminal, the method further comprises: after detecting the uplink transmission cancellation instruction, determining a time-frequency resource of a cancelled uplink transmission according to second preset configuration information by the terminal.

5. The method of monitoring the uplink transmission cancellation instruction according to claim 4, wherein the second preset configuration information comprises a configured uplink BWP.

6. The method of monitoring the uplink transmission cancellation instruction according to claim 1, wherein after monitoring the uplink transmission cancellation instruction during the BWP switching process by the terminal, the method further comprises: after detecting the uplink transmission cancellation instruction, ignoring the detected uplink transmission cancellation instruction by the terminal.

7. The method of monitoring the uplink transmission cancellation instruction according to claim 6, wherein ignoring the detected uplink transmission cancellation instruction by the terminal comprises:
when configuration information of the uplink transmission cancellation instruction of the BWP before the switching and configuration information of the uplink transmission cancellation instruction of the BWP after the switching are at least partially different, ignoring the detected uplink transmission cancellation instruction by the terminal.

8. A terminal, comprising:
a storage, a processor, and a computer program stored on the storage and executable by the processor, wherein when the computer program is executed by the processor, the processor implements a method of monitoring an uplink transmission cancellation instruction, the method comprises:
when a terminal switches a bandwidth part (BWP), determining, by the terminal according to first preset configuration information, whether to perform monitoring of uplink transmission cancellation instruction during a BWP switching process;
when the monitoring of the uplink transmission cancellation instruction is determined to be performed, monitoring the uplink transmission cancellation instruction during the BWP switching process by the terminal;
when the monitoring of the uplink transmission cancellation instruction is determined not to be performed, not monitoring the uplink transmission cancellation instruction during the BWP switching process by the terminal,
wherein,
the first preset configuration information comprises at least one of: first configuration information of an uplink transmission cancellation instruction configured by a downlink BWP, or second configuration information of an uplink transmission cancellation instruction configured by an uplink BWP;
when only switching of the uplink BWP occurs in the terminal, determining whether to perform the monitoring of the uplink transmission cancellation instruction during the BWP switching process by the terminal comprises:
according to whether the uplink BWP before or after the switching configures the second configuration information, determining whether to perform the monitoring of the uplink transmission cancellation instruction during the BWP switching process by the terminal; or,
when only switching of the uplink BWP occurs in the terminal, determining whether to perform the monitoring of the uplink transmission cancellation instruction during the BWP switching process by the terminal comprises:
according to whether the second configuration information configured by the uplink BWP before the switching is same as the second configuration information configured by the uplink BWP after the switching, determining whether to perform the monitoring of the uplink transmission cancellation instruction during the BWP switching process by the terminal; or,
when the terminal performs switching of the uplink BWP and switching of the downlink BWP concurrently, determining whether to perform the monitoring of the uplink transmission cancellation instruction during the BWP switching process by the terminal comprises:
according to whether the uplink BWP and the downlink BWP before or after the switching configure complete configuration information, determining whether to perform the monitoring of the uplink transmission cancellation instruction during the BWP switching process by the terminal, wherein the complete configuration information indicates that the downlink BWP configures the first configuration information and the uplink BWP configures the second configuration information.

9. A non-transitory computer readable storage medium, wherein a computer program is stored on the computer readable storage medium, and wherein when the computer program is executed by a processor, the processor implements a method of monitoring an uplink transmission cancellation instruction according to claim 1, the method comprises:
when a terminal switches a bandwidth part (BWP), determining, by the terminal according to first preset configuration information, whether to perform monitoring of uplink transmission cancellation instruction during a BWP switching process;
when the monitoring of the uplink transmission cancellation instruction is determined to be performed, monitoring the uplink transmission cancellation instruction during the BWP switching process by the terminal;

when the monitoring of the uplink transmission cancellation instruction is determined not to be performed, not monitoring the uplink transmission cancellation instruction during the BWP switching process by the terminal, wherein, the first preset configuration information comprises at least one of: first configuration information of an uplink transmission cancellation instruction configured by a downlink BWP, or second configuration information of an uplink transmission cancellation instruction configured by an uplink BWP;

when only switching of the uplink BWP occurs in the terminal, determining whether to perform the monitoring of the uplink transmission cancellation instruction during the BWP switching process by the terminal comprises:

according to whether the uplink BWP before or after the switching configures the second configuration information, determining whether to perform the monitoring of the uplink transmission cancellation instruction during the BWP switching process by the terminal; or, when only switching of the uplink BWP occurs in the terminal, determining whether to perform the monitoring of the uplink transmission cancellation instruction during the BWP switching process by the terminal comprises:

according to whether the second configuration information configured by the uplink BWP before the switching is same as the second configuration information configured by the uplink BWP after the switching, determining whether to perform the monitoring of the uplink transmission cancellation instruction during the BWP switching process by the terminal; or, when the terminal performs switching of the uplink BWP and switching of the downlink BWP concurrently, determining whether to perform the monitoring of the uplink transmission cancellation instruction during the BWP switching process by the terminal comprises:

according to whether the uplink BWP and the downlink BWP before or after the switching configure complete configuration information, determining whether to perform the monitoring of the uplink transmission cancellation instruction during the BWP switching process by the terminal, wherein the complete configuration information indicates that the downlink BWP configures the first configuration information and the uplink BWP configures the second configuration information.

10. The terminal according to claim 8, wherein when the computer program is executed by the processor, the processor further implements: not monitoring the uplink transmission cancellation instruction by the terminal when the terminal does not receive downlink control information for scheduling uplink transmission.

11. The terminal according to claim 8, wherein when the computer program is executed by the processor, the processor further implements, after monitoring the uplink transmission cancellation instruction during the BWP switching process by the terminal: after detecting the uplink transmission cancellation instruction, determining a time-frequency resource of a cancelled uplink transmission according to configuration information of the uplink transmission cancellation instruction of a first BWP by the terminal; wherein, the first BWP includes at least one of: an uplink BWP before switching, a downlink BWP before switching, an uplink BWP after switching, or a downlink BWP after switching.

12. The terminal according to claim 8, wherein when the computer program is executed by the processor, the processor further implements, after monitoring the uplink transmission cancellation instruction during the BWP switching process by the terminal: after detecting the uplink transmission cancellation instruction, determining a time-frequency resource of a cancelled uplink transmission according to second preset configuration information by the terminal.

13. The terminal according to claim 12, wherein the second preset configuration information comprises a configured uplink BWP.

14. The terminal according to claim 8, wherein when the computer program is executed by the processor, the processor further implements, after monitoring the uplink transmission cancellation instruction during the BWP switching process by the terminal: after detecting the uplink transmission cancellation instruction, ignoring the detected uplink transmission cancellation instruction by the terminal.

15. The terminal according to claim 14, wherein ignoring the detected uplink transmission cancellation instruction by the terminal comprises: when configuration information of the uplink transmission cancellation instruction of the BWP before the switching and configuration information of the uplink transmission cancellation instruction of the BWP after the switching are at least partially different, ignoring the detected uplink transmission cancellation instruction by the terminal.

16. The non-transitory computer readable storage medium according to claim 9, wherein when the computer program is executed by the processor, the processor further implements: not monitoring the uplink transmission cancellation instruction by the terminal when the terminal does not receive downlink control information for scheduling uplink transmission.

17. The non-transitory computer readable storage medium according to claim 9, wherein when the computer program is executed by the processor, the processor further implements, after monitoring the uplink transmission cancellation instruction during the BWP switching process by the terminal: after detecting the uplink transmission cancellation instruction, determining a time-frequency resource of a cancelled uplink transmission according to configuration information of the uplink transmission cancellation instruction of a first BWP by the terminal; wherein, the first BWP includes at least one of: an uplink BWP before switching, a downlink BWP before switching, an uplink BWP after switching, or a downlink BWP after switching.

18. The non-transitory computer readable storage medium according to claim 9, wherein when the computer program is executed by the processor, the processor further implements, after monitoring the uplink transmission cancellation instruction during the BWP switching process by the terminal: after detecting the uplink transmission cancellation instruction, determining a time-frequency resource of a cancelled uplink transmission according to second preset configuration information by the terminal.

19. The non-transitory computer readable storage medium according to claim 18, wherein the second preset configuration information comprises a configured uplink BWP.

20. The non-transitory computer readable storage medium according to claim 9, wherein when the computer program is executed by the processor, the processor further implements, after monitoring the uplink transmission cancellation instruction during the BWP switching process by the terminal: after detecting the uplink transmission cancellation instruction, ignoring the detected uplink transmission cancellation instruction by the terminal.

* * * * *